Feb. 11, 1958     O. C. PALMER     2,822,797
TOOL FOR USE IN HORIZONTAL AND VERTICAL
GRINDING WHEEL DRESSING
Filed Oct. 15, 1954

INVENTOR.
ORRIN C. PALMER
BY

United States Patent Office 2,822,797
Patented Feb. 11, 1958

2,822,797
TOOL FOR USE IN HORIZONTAL AND VERTICAL GRINDING WHEEL DRESSING

Orrin C. Palmer, Melrose, Mass.

Application October 15, 1954, Serial No. 462,475

2 Claims. (Cl. 125—11)

The present invention relates to a tool particularly adapted for use in vertical and horizontal diamond dressing of the grinding wheels of surface grinders.

In the operation of surface grinders, production is interrupted at frequent intervals in order that their grinding wheels may be dressed. The general objective of this invention is to provide a tool adapted to be economically produced and to enable accurate wheel dressing to be effected with maximum speed and efficiency.

The generally stated objective is attained by a dressing tool having a diamond holder so connected to a base that its center of gravity is advanced towards the central zone of the base as the position of the holder is elevated with respect thereto thus to attain maximum stability with a structure of minimum weight.

In the accompanying drawings, there is shown an illustrative embodiment of the invention from which this and other of its objectives, novel features, and advantages will be readily apparent.

Figure 1:
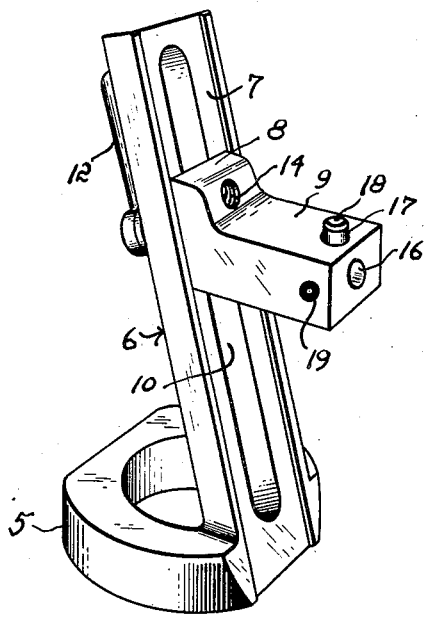
Fig. 1 is a view in perspective of the dressing tool.
Figure 2:
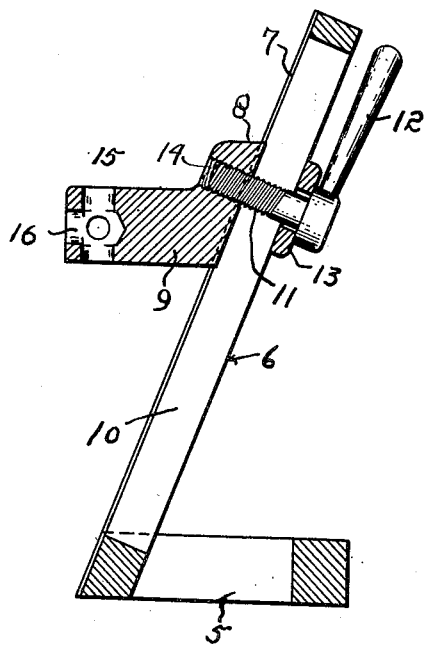
Fig. 2 is a vertical section thereof.

The dressing tool illustrated in the drawings is adapted for use in dressing any conventional surface grinding wheel. While it is shown as having a flat surfaced and centrally apertured base 5 for use when the grinder has a magnetically operated work holder, the base 5 may be clamped in place when used with other work holding means. A slideway generally indicated at 6 is inwardly and upwardly inclined from one edge of the base 5.

The slideway 6 has a shallow channel 7 extending from end-to-end thereof to receive the complementally inclined end 8 of the holder 9 and is centrally slotted as at 10 to receive the locking bolt 11 provided with a handle 12 and extending freely through the washer 13, said slot 10 and threaded into the threaded bore 14 of the holder 9.

The holder 9 is shown as having a vertical bore 15 and a horizontal bore 16 in either of which the mounting 17 for the diamond 18 may be securely locked as by the set screw 19.

By elevation of the diamond relative to the work holding means rather than by vertical adjustments of the wheel spindle continuously during wheel dressing, the dressing operation is effected with greater speed and convenience. Because the slideway 6 is so inclined that the center of gravity of the holder 9 advances towards the center of the base 5 as the diamond is elevated, stability results ensuring accuracy in the dressing operation.

What I therefore claim and desire to secure by Letters Patent is:

1. A wheel dressing device comprising a base having a flat support engaging surface and a part inclined upwardly and rearwardly from the front thereof, said part having a channel in its front face extending from end to end thereof to provide a slideway and provided with a slot extending therethrough and disposed lengthwise of said channel, a mount including a diamond holder and having its rear part shaped and dimensioned to slidably fit said channel, and clamping means slidably engaging the rear face of said part and including an adjustable threaded connection with said mount, said part being so dimensioned that in the uppermost position of said mount, its center of gravity is within the area defined by the base.

2. The device of claim 1 in which the part extends from the front edge of the base and the channel also includes said front edge.

References Cited in the file of this patent

UNITED STATES PATENTS

| 1,366,285 | Ross | Jan. 18, 1921 |
| 1,447,383 | Hanson | Mar. 6, 1923 |
| 2,402,089 | Rouse | June 11, 1946 |
| 2,425,453 | Bavosi | Aug. 12, 1947 |
| 2,458,768 | Daily | Jan. 11, 1949 |
| 2,640,477 | Norlander | June 2, 1953 |

OTHER REFERENCES

American Machinist, vol. 60, No. 11, March 13, 1924.